Figure 4:
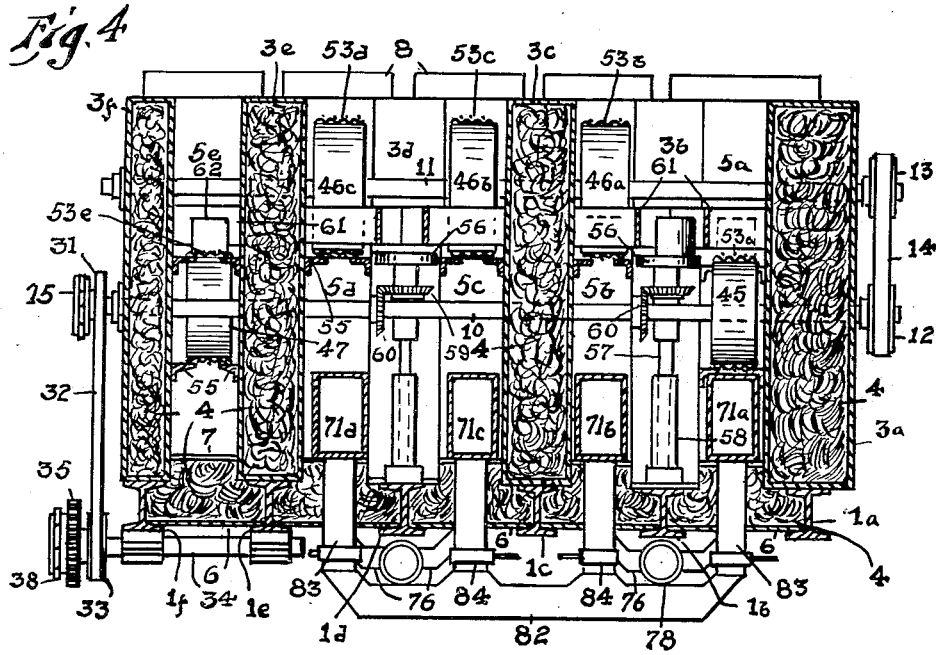

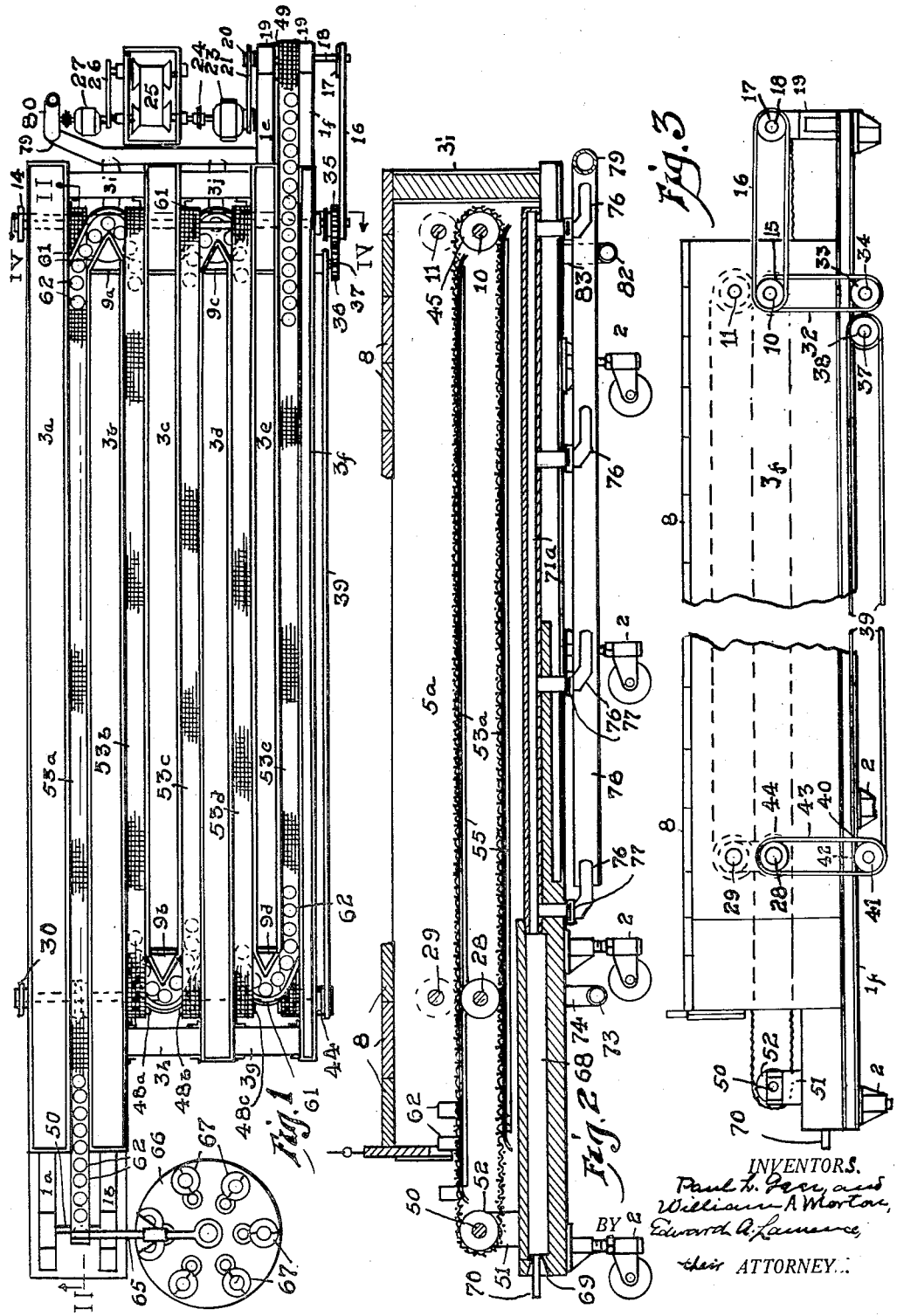

July 10, 1934.   P. L. GEER ET AL   1,966,292
APPARATUS FOR ANNEALING GLASSWARE AND THE LIKE
Filed March 30, 1927   2 Sheets-Sheet 2

INVENTORS.
Paul L. Geer, and
William A. Norton,
BY Edward A. Lawrence,
their ATTORNEYS.

Patented July 10, 1934

1,966,292

UNITED STATES PATENT OFFICE 1,966,292

APPARATUS FOR ANNEALING GLASSWARE AND THE LIKE

Paul L. Geer, Bellevue, and William A. Morton, Pittsburgh, Pa., assignors to Amco, Incorporated, Pittsburgh, Pa., a corporation of Pennsylvania Application March 30, 1927, Serial No. 179,460

14 Claims. (Cl. 49—47)

One of the objects of the present invention is the provision of a continuous annealing operation wherein the articles are received directly from the take-out device of a forming machine at substantial forming temperature, usually about 1200 degrees Fahr. and as they are carried through the lehr, have their temperature gradually reduced to the proper temperature of delivery at the discharge end of the lehr, usually about 100 degrees Fahr.

Another object which we have in view is the reception by the lehr conveyer of the ware at a uniform temperature and at substantially the temperature at which the ware is removed from the forming machine. Unless the individual articles of ware are received by the lehr at substantially the same temperature, the heat treatment of the articles is not uniform and thus the annealing is irregular and unsatisfactory.

In the present practice the lehr conveyer is relatively wide and the articles are positioned in transverse rows on the conveyer. As the articles are now manually placed one at a time in transversely disposed rows on the lehr conveyer as they are individually received from the forming machine, it is evident that the temperature of the individual articles in a row is not uniform but varies in accordance with the sequence in which the pieces were placed in the row.

Again in the lehr now in use, a single straight-away conveyer is employed and both ends of the conveyer are exposed to atmospheric cooling. Thus the entire length of the conveyer must be reheated to approximate the necessary heat of the ware at the receiving end of the lehr.

Again in the present practice the ware is carried through the lehr by the top strand of the conveyer while the returning bottom strand travels through the lower and cooler portion of the lehr tunnel. In a tunnel, especially an indirectly heated tunnel, the air strata in the upper portion of the tunnel are of higher temperature, and therefore the returning strand of the conveyer is subject to the lower temperatures and must be reheated. This requires an expenditure of fuel in which we are able to materially economize.

Another object which we have in view is the provision of a compact lehr which will require much less factory space than the lehr in present use and which will be readily portable so as to be shifted about the factory as the work requires.

Other objects will appear from the following description.

For the accomplishment of these and other objects, we have invented a multiple conveyer lehr provided with parallel tunnels each containing an endless conveyer, the two outer conveyers, the receiving conveyer and the delivery conveyer only being extended outside of the lehr and exposed to atmosphere while the intermediate conveyer or conveyers are entirely within the lehr and therefore protected from atmospheric cooling. Thus the intermediate conveyer or conveyers, after having been initially heated to the proper temperature require very little heating to maintain them at proper working temperature.

In the case of the intermediate conveyer or conveyers, the bottom strand is preferably employed to carry the ware, the return strand being above the ware and in the upper portion of the tunnel where it absorbs the sensible heat from the ware and the higher temperatures present in the upper portion of the tunnel, and the upper strand is thus enabled to satisfy the thermal capacity of the conveyer to approximately the temperature of the ware which is about to be delivered upon the conveyer. The travel of the top strand from the discharge end of a tunnel toward its receiving end facilitates the removal of heat from the discharge end of the tunnel and thus assists in rendering the cooling process automatic, and also adds to the fuel economy.

Automatic means are provided for transferring the ware from one conveyer to the other, said means being located entirely within the lehr and being thus protected from atmospheric cooling.

We employ relatively narrow tunnels and conveyers for the purpose of receiving the ware in the order of its reception from the forming machine, usually one piece at a time and conduct the pieces in like order, usually in single file, through the lehr.

By this provision we make possible the automatic placing of the ware upon the exposed end of the receiving conveyer by the take-out device of the forming machine, which removes the pieces of ware from the molds as the latter are brought in turn into the take-out position. We thus insure the delivery of the individual pieces to the lehr at uniform temperature and as the pieces receive uniform treatment in the lehr the annealing of the product is uniform and the loss due to imperfect annealing reduced to a minimum.

We provide new and improved means for maintaining the proper heat gradient in the interior of the lehr, and also for preliminarily heating the tunnels.

Other novel features of construction and arrangement of parts will appear from the following description.

Figure 5:
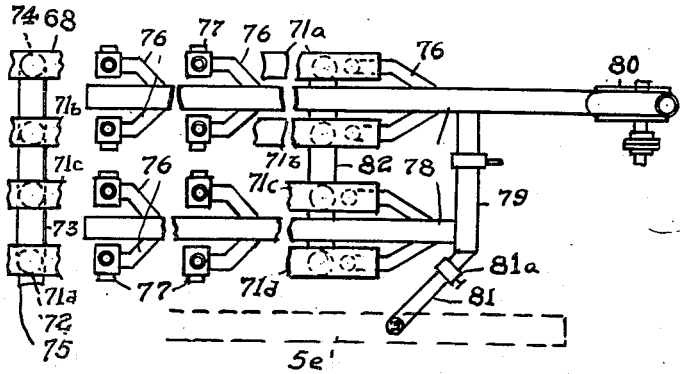

In the accompanying drawings, wherein we have illustrated the best embodiment of the principles of our invention now known to us, Fig. 1 is a horizontal section taken longitudinally of the lehr, with the roof removed, and also showing the forming machine with its take-off which deposits ware directly upon the receiving conveyer of the lehr; Fig. 2 is an incomplete longitudinal section taken along the line II—II in Fig. 1; Fig. 3 is a broken side elevation of the lehr; Fig. 4 is an enlarged cross section taken along the line IV—IV in Fig. 1, and Fig. 5 is a diagrammatic view showing the exhauster and its duct connections.

Referring to the drawings, the base of the lehr is formed of a platform whose longitudinal girders are indicated at 1a, 1b, 1c, 1e and 1f. The base is preferably mounted on the swivel casters 2 so that the lehr may be readily portable.

The exterior side walls of the lehr and the partitions between the lehr tunnels are formed by the vertically disposed and inclosed metal boxes 3a, 3b, 3c, 3d, 3e and 3f which are rigidly mounted on the girders and which have an interior filling as at 4 of mineral wool, asbestos, or some other suitable heat-insulating material.

These boxes form the side walls of the parallel tunnels 5a, 5b, 5c, 5d and 5e. The front ends of the tunnels 5b, 5c, 5d and 5e are closed by the transversely disposed boxes 3g and 3h, while the rear ends of the tunnels 5a, 5b, 5c and 5d are closed by the transversely disposed boxes 3i and 3j. The tunnel 5a is the receiving tunnel, the tunnel 5e the delivery tunnel, and the tunnels 5b, 5c and 5d are the intermediate tunnels.

The width of the boxes 3a, 3b, 3c, 3d, 3e and 3f diminishes in the order named or toward the cooler side of the lehr.

The girders 1a and 1b extend forwardly from the body of the lehr to carry the exposed front end of the entrance conveyer, and the boxes 3a and 3b are also extended a less distance forwardly. The girders 1e and 1f are extended rearwardly to support the rear end of the delivery conveyer.

The spaces between the lehr flanges of the girders are closed by the bottom plates 6, and 7 represents the tunnel floors which are supported from the side walls of the boxes enclosing the tunnels. The spaces between the girders and the bottom plates 6 and the floor 7 are filled with the heat-insulating material 4.

The tunnels are provided with removable roofing to permit access, such as the tiles 8, which are laid on the boxes and span the tops of the tunnels.

The box 3b which forms the partition between the tunnels 5a and 5b stops short of the rear ends of said tunnels, thus providing a communicating opening 9a between said tunnels. Likewise the box 3c which forms the partition between the tunnels 5b and 5c stops short of the front ends of said tunnels, providing the inter-communicating opening 9b. The box 3d which forms the partition between the tunnels 5c and 5d likewise stops short of the rear ends of the tunnels, providing the inter-communicating opening 9c. Likewise the box 3e which forms the partition between the tunnels 5d and 5e stops short of the front ends of said tunnels to provide an inter-communicating opening 9d.

It is thus seen that a continuous lehr passage is formed by the oppositely connected tunnels.

10 and 11 are a pair of horizontally disposed drum shafts adjacent to the rear end of the lehr lying in the same vertical plane and extending through the boxes and spanning the five tunnels and also the intercommunicating openings 9a and 9c. At one side of the lehr, the right side in Fig. 4, the protruding ends of the drum shafts 10 and 11 are provided with sprockets 12 and 13 respectively, which sprockets are connected by a chain 14 whereby the shafts rotate in the same direction and at the same speed.

The opposite end of the drum shaft 10 protrudes and is provided with a sprocket 15 connected by a chain 16 with a second sprocket 17 on one end of a shaft 18 which is journaled in bearings 19 mounted on the rearwardly extending ends of the girders 1e and 1f. The opposite end of the shaft 18 is provided with a sprocket 20 connected by a chain 21 to the sprocket 22 on the shaft of a speed reducer mechanism 23 which in turn is flexibly coupled as at 24 to one of the shafts of a variable speed mechanism 25 whose other shaft is provided with a sprocket connected by a chain 26 to a sprocket on the driving shaft of the electric motor 27.

The drum shaft 18 and the drum shafts 10 and 11 are assumed to be driven in a clockwise direction and at equal speed. At the front of the lehr a second pair of horizontally disposed shafts 28 and 29 positioned in the same vertical plane extend through the boxes and span the tunnels and also the inner communicating opening 9b and 9d. The shafts 10 and 28 are in the same horizontal plane and the shafts 11 and 29 are in the same horizontal plane. The protruding ends of the shafts 28 and 29 are provided with sprockets which are connected by the chain 30. The shafts 28 and 29 are rotated in a counterclockwise direction and at the same speed, and at an equal speed with the shafts 10, 11 and 18.

The protruding end of the shaft 10 carrying the sprocket 15 also carries a second sprocket 31 connected by a chain 32 with a sprocket 33 on a horizontally disposed jack shaft 34 positioned below the shafts 10 and 11. The shaft 34 is provided with a pinion 35 meshing with a second pinion 36 on a parallel jack shaft 37. The shaft 37 is also provided with a sprocket 38 connected by a chain 39 with a sprocket 40 on the front jack shaft 41 positioned below the drum shaft 28. The shaft 41 is provided with a second sprocket 42 which is connected by a chain 43 to a sprocket 44 on the end of the shaft 28. Thus the shafts 28 and 29 are driven in the reverse direction to that of the drum shafts 10 and 11.

The drum shaft 10 has fixed thereon a conveyer drum 45 positioned in the rear end of the tunnel 5a. The drum shaft 11 carries the conveyer drums 46a, 46b and 46c in the ends of the tunnels 5b, 5c and 5d respectively. The drums 46a and 46c are fixed on the drum shaft 11, while the drum 46b is loose thereon.

The shaft 28 is provided with a drum 47 loose thereon and located in the front end of the tunnel 5e. The shaft 29 carries the drums 48a, 48b and 48c which are located in the front ends of the tunnels 5b, 5c and 5d respectively, the drum 48b being tight on its shaft while the drums 48a and 48c are loose on their shafts.

The shaft 18 has a conveyer drum 49 tight thereon and located between the girders 1e and 1f.

50 is a shaft journaled in bearings 51 on the extended front ends of the girders 1a and 1b, and 52 is a conveyer drum mounted on said shaft between said girders.

53a is an endless conveyer mounted on the drums 45 and 52 and running in the tunnel 5a, the front end of the conveyer extending outwardly from the end of the tunnel so that ware can be placed upon the conveyer. 53b is an endless conveyer mounted on the drums 46a and 48a and running in the tunnel 5b. 53c is an endless conveyer mounted on the drums 46b and 48b and running in the tunnel 5c. 53d is an endless conveyer mounted on the drums 46c and 48c and running in the tunnel 5d. 53e is an endless conveyer mounted on the drums 47 and 49 and running in the tunnel 5e.

It will be noted that the bottom strands of the intermediate conveyers 53b, 53c and 53d are on the same horizontal level as the top strands of the receiving conveyer 53a and the delivery conveyer 53e. The ware is carried along by the top strands of the conveyer 53a and 53e and by the bottom strands of the conveyers 53b, 53c and 53d.

If it be desired to increase the speed of delivery by the conveyer 53e as compared to that of the other conveyers, the speed of the shaft 18 and its drum 49 may be rotated at a higher speed than that of the other drum shafts and drums.

Between the drums the stands of the conveyers are supported against sagging by shelves extending outwardly from the walls of the tunnels and formed by angle irons 55.

Any suitable character of endless conveyer may be employed, but we prefer to employ conveyers of the woven wire belt type and the conveyer drums are provided, as shown, with perimetral surfaces characterized by shallow rounded teeth to engage and grip the conveyer.

The inner communicating openings 9a, 9b, 9c and 9d are occupied with the circular transfer disks 56 which are imposed between the adjacent conveyers and at a level with their ware bearing strands. Said disks are fixed on vertical stems 57 which are journaled in the step bearings 58 mounted on the floors of the inner communicating openings, and the stems 57 are provided with bevel pinions 59 meshing with similar pinions 60 carried by the lower drum shafts as shown in the case of the shaft 10 in Fig. 4. Thus the disks are rotated in the proper direction to deliver the ware from one conveyer to the other.

61 represents a pair of spaced apart guides or rails attached to the boxes which form the walls of the tunnels and extending over the carrying strand of each of the adjacent conveyers and also over the transfer disk, forming between them an arcuate track which the ware indicated at 62 will follow from the one conveyer on to the disk and then as the disk rotates from the disk on to the next conveyer.

As will be observed, the tunnels are relatively narrow and the conveyers are of proper width to carry the product 62 as received from the take-out device, usually in single file through the lehr. Thus, as indicated in Fig. 1 the take-out mechanism 65 of the fabricating machine 66, indicated in Fig. 1, is arranged to extend over the front end of the entrance conveyer 53a and deposits the ware one at a time as the molds 67 move into the take-out position.

Should the take-out device remove and deliver the ware two at a time, as from twin molds, the pieces of ware would be deposited in pairs on the conveyer.

We have simply indicated the take-out device of the fabricating machine in a general way, as there are numerous types of such devices in use and the particular character of the take-out device is no part of our present invention.

68 is a combustion chamber extending rearwardly under the front end of the conveyer 53a and into the front end of the tunnel 5a. The front end of the chamber 68 is provided with a port 69 into which projects the gas burner 70.

The rear end of the combustion chamber 68 is connected with a duct 71a running along the bottom of the tunnel 5a, and similar ducts 71b, 71c and 71d are positioned in the bottoms of the tunnels 5b, 5c and 5d, respectively.

The front ends of the ducts 71b, 71c and 71d are connected by branch pipes 72 to a header 73, which header is connected by a pipe 74 with the combustion chamber 68. The branch pipes 72 are provided with individual gates or valves 75.

Leading off at intervals from the ducts 71a, 71b, 71c and 71d are the pipes 76, each provided with a valve or gate 77 and connected to manifolds 78. The manifolds 78 are connected at the rear of the furnace to a header 79 which in turn is connected to the intake of an exhauster 80 driven by the motor 27. The header 79 is also connected by a pipe 81, having a valve 81a, to a port in the floor of the tunnel 5e adjacent to its rear end. The four ducts 71a, 71b, 71c and 71d are also provided with a cross connection at their ends comprising a manifold 82 located underneath the lehr and connected to each of said ducts by the pipes 83 each provided with a valve or gate 84.

In the operation of our device, the ware is automatically delivered piece by piece to and deposited on the front end of the conveyer 53a by the take-out device 65 of the forming machine 66, the rate of delivery being determined by the speed of rotation of the mold table. The conveyer 53a receives the ware in single file on its top strand and carries the ware through the tunnel 5a to the rear end of the latter. At the rear end of the tunnel 5a the ware is automatically transferred to the bottom strand of the conveyer 53b which carries the ware forwardly to the front end of the tunnel 5b where the ware is automatically transferred to the bottom strand of the conveyer 53c. The conveyer 53c carries the ware to the rear end of the tunnel 5c where the ware is automatically delivered to the bottom strand of the conveyer 53d which carries the ware to the front end of the tunnel 5d where the ware is delivered to the top strand of the conveyer 53e which carries the ware rearwardly through the tunnel 5e and out of the lehr on the exposed part of the conveyer whence the ware is removed by the packers. It is thus evident that manual handling of the ware between the forming machine and the receiving conveyer of the lehr is avoided and the pieces enter the lehr at uniform temperature so as to react uniformly to the annealing process.

In case the take-out device delivers more than one piece at a time, the same are deposited on the receiving conveyer in a transversely disposed row and are received by the lehr at uniform temperature and thus react uniformly to the annealing treatment.

One of the present causes of material loss in ware due to improper annealing is the custom of placing the pieces of ware one at a time in transverse rows on the lehr conveyer with the result that the pieces constituting a row enter the lehr at different temperatures and therefore react differently to the treatment in the lehr.

We employ the automatic take-out device of the forming machine to deposit the pieces directly on the entrance conveyer, the deposits being made at uniform intervals directly from the molds and thus the pieces enter the lehr at substantially the same temperature, usually about 1200 degrees Fahr. The result is the pieces react in the same manner and degree to the annealing treatment and the loss in product which is now attributable to imperfect annealing is eliminated.

The employment of the bottom strands of the intermediate conveyer for carrying the ware is a matter of very great importance. If the top strand were so employed the return strand would travel in the lower and cooler air strata of the tunnel and a heat replacement would be necessary to adapt the conveyer to the ware-receiving temperature.

However, in any heated tunnel, especially in the case of an indirectly heated tunnel in which sufficiently active convection currents are not present to equalize the temperature in the vertical cross-sectional area of the tunnel, the upper air strata in the tunnel are always at the high temperature, and if the bottom strand of the conveyer be employed to carry the ware, the return strand will travel through the upper and more highly heated air strata and will absorb the surplus heat and will be heated to a temperature tending to coincide with that of the ware to be received.

Furthermore, the continuous return of heat from the upper portion of the tunnel to the lower portion thereof works to transfer the heat from the discharge end of the tunnel to the receiving end thereof, thus assisting in maintaining the desired heat gradient in the tunnel and adding to the fuel economy of the lehr.

If desired the intermediate conveyer or conveyers may be arranged to carry the ware on their top strands, but we prefer the other arrangement above referred to for the reasons recited.

The internal temperature may be exactly controlled by means of the exhauster which is connected to the tunnel ducts, the heat currents from the combustion chamber being drawn through said ducts or such portions of the same as may be required to establish and maintain the proper temperatures and heat gradient in the interior of the lehr. The pipes leading off from the ducts at intervals along the lengths of the latter to the suction manifolds and the provision of valves or gates in each of said pipes furnishing the necessary control.

The pipe leading from the rear end of the delivery tunnel 5e to the header of the exhauster enables the heat to be drawn from the interior of the lehr through the delivery tunnel to effect its preliminary heating. The cross header which connects the tunnels 5a, 5b, 5c and 5d at their rear ends also aids in rapidly accomplishing the preliminary heating of the lehr.

It will be noted that the two outer conveyers, the entrance conveyer and the delivery conveyer are alone exposed to atmosphere and have opportunity to remove heat from the lehr, the intermediate tunnel or tunnels and their conveyers being enclosed from atmosphere. This arrangement results in a very marked fuel economy compared to the single conveyer lehr whose conveyer is exposed to atmosphere at both ends.

The parallel or return tunnel arrangement of our improved lehr makes possible a lehr structure of greatly reduced exterior dimensions and one readily portable, thereby requiring less valuable factory space and also enabling the lehr to be rolled into position relative to a forming machine which is to be put into operation. Thus a more convenient and economical factory arrangement is possible as the lehr may be quickly shifted into convenient position relative to the other factory equipment.

What we desire to claim is:—

1. A lehr for glassware and the like comprising a plurality of parallel tunnels in communication at their opposite ends, the outside tunnels communicating to atmosphere, endless conveyers in said tunnels arranged to convey the ware in opposite directions, and means for transferring the ware from the discharge end of one conveyer to the receiving end of the next conveyer, the conveyers in the outside tunnels carrying the ware on their top strands while the intermediate conveyer or conveyers carry the ware on their bottom strands.

2. In a lehr for glassware and the like, the combination of tunnels connected together in series, a conveyer in each of said tunnels for carrying the ware through the latter, the ware traveling on the top strand of one conveyer and on the bottom strand of a second conveyer, and means for transferring the ware from the first mentioned conveyer to the second mentioned conveyer.

3. In a lehr for glassware and the like, the combination of a plurality of tunnels connected together in series, the outside tunnels being in communication at one of their ends to atmosphere for receiving and delivering the ware and the intermediate tunnel or tunnels having enclosed ends, a conveyer in each of said tunnels to carry the ware through the same, the conveyers of the outside tunnels carrying the ware on their top strand while the conveyer of the intermediate tunnel carries the ware on its bottom strand, and means for transferring the ware from one conveyer to the other.

4. In a lehr for annealing glassware and the like, the combination of a tunnel, an endless conveyor working in said tunnel, means for placing the ware on the lower strand of the conveyer and for removing it therefrom, the ware being conveyed on the lower strand of the conveyer whereby the return strand of the conveyer is reheated by the ware on the working strand.

5. In a lehr for annealing glassware and the like, the combination of a tunnel, an endless conveyer working in said tunnel, and means for delivering the ware to the lower strand of said conveyer whereby the return strand is reheated by the ware on the working strand.

6. A lehr for annealing glassware and the like comprising a plurality of parallel tunnels, an endless conveyer in each of said tunnels, certain of said conveyers transporting the ware on their lower strands and others transporting the ware on their upper strands.

7. In a lehr for glassware and the like, the combination of a tunnel, an endless conveyer having both its strands contained in said tunnel, and the idle strand of the conveyer being located above the working strand upon which the work is conveyed whereby a heat exchange is effected from the ware on the working strand to the idle strand, whereby to accumulate heat in the idle portion of the conveyer to substantially the same temperature as that of the ware at any point in the tunnel.

8. In a lehr for glassware and the like, the combination of a plurality of horizontally disposed parallel tunnels having partition walls which separate and are common to adjacent tunnels, horizontally disposed endless conveyers working in each of said tunnels, and mechanical means for transferring the ware from the delivery end of the conveyer in one tunnel to the receiving end of the conveyer in the next tunnel.

9. In a lehr for glassware and the like, the combination of a plurality of horizontally disposed parallel tunnels having common partition walls, means for conveying ware through each of said tunnels, means for transferring the ware from one tunnel to the next tunnel, an individual heating flue extending longitudinally of and associated with each of the tunnels, and means connected with each of said flues at intervals whereby to regulate the heat of different portions of each of the tunnels without varying the heat of the remaining tunnels.

10. In a lehr for glassware and the like, the combination of a plurality of horizontally disposed parallel tunnels having common partition walls, means for conveying ware through each of said tunnels, means for transferring the ware from one tunnel to the next tunnel, an individual heating flue extending longitudinally of and associated with each of the tunnels, and means for removing the heat from different portions of said flues without varying the heat of the remaining tunnels.

11. In a lehr for glassware and the like, the combination of a plurality of horizontally disposed parallel tunnels having common partition walls, means for conveying the ware through each of said tunnels, means for transferring the ware from one tunnel to the next tunnel, an individual heating flue extending longitudinally of and associated with each of said tunnels, one of said tunnels being extended beyond the end of the remaining tunnels and its heating flue being extended to substantially the extended end of the corresponding tunnel.

12. In a lehr for glassware and the like, the combination of a plurality of horizontally disposed parallel tunnels having common partition walls, means for conveying the ware through each of said tunnels, means for transferring the ware from one tunnel to the next tunnel, an individual heating flue extending longitudinally of and associated with each of said tunnels, one of said tunnels being extended beyond the end of the remaining tunnels and its heating flue being extended to substantially the extended end of the corresponding tunnel, and means for regulating the heat in the individual heating flue without varying the heat of the remaining tunnels.

13. For use in connection with a glass fabricating machine having a take-out device to remove the finished ware from the machine and deposit it upon a receiver, a lehr comprising in combination a plurality of parallel tunnels having common partition walls, means for controlling the temperature in the individual tunnels, means for conveying the ware in single file through each of the tunnels, means for transferring the ware from one tunnel to the other, and one of said tunnels being extended beyond the end of the remaining tunnels and having its conveying means extended into receiving relation with the take-out device whereby the ware is deposited in single file on the lehr conveyor.

14. For use in connection with a glass fabricating machine having a take-out device to remove the finished ware from the machine and deposit it upon a receiver, a lehr comprising in combination a plurality of parallel tunnels having common partition walls, means for controlling the temperature in the individual tunnels, means for conveying the ware in single file through each of the tunnels, means for transferring the ware from one tunnel to the other, one of said tunnels being extended beyond the end of the remaining tunnels and having its conveying means extended into receiving relation with the take-out device whereby the ware is deposited in single file on the lehr conveyor, and another of said tunnels being extended beyond the other end of the remaining tunnels and having its conveying means extended beyond the extended end of said tunnel to permit the removal of the annealed ware.

PAUL L. GEER.
WILLIAM A. MORTON.